US008161457B2

(12) United States Patent
Huber et al.

(10) Patent No.: US 8,161,457 B2
(45) Date of Patent: Apr. 17, 2012

(54) DETECTION OF ERRORS CAUSED BY INTERACTIONS OF INDEPENDENT SOFTWARE VENDOR CODE WITH HOST CODE

(75) Inventors: Harold S. Huber, Tucson, AZ (US); Quyen H. Pham, Vail, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 11/682,851

(22) Filed: Mar. 6, 2007

(65) Prior Publication Data

US 2008/0222619 A1    Sep. 11, 2008

(51) Int. Cl.
*G06F 9/24* (2006.01)
*G06F 11/00* (2006.01)
(52) U.S. Cl. ............ 717/124; 714/38.1; 714/25; 714/35
(58) Field of Classification Search .......... 717/124–135; 714/25, 35, 38.1
See application file for complete search history.

(56) References Cited

U.S. PATENT DOCUMENTS

| | | | |
|---|---|---|---|
| 4,937,825 A | | 6/1990 | Ballard et al. |
| 6,108,797 A | * | 8/2000 | Lin et al. ........................ 714/6.13 |
| 6,163,858 A | * | 12/2000 | Bodamer ........................ 714/34 |
| 6,633,876 B1 | * | 10/2003 | Heatlie ................................. 1/1 |
| 7,277,901 B2 | * | 10/2007 | Parker et al. ........................ 1/1 |
| 7,712,087 B2 | * | 5/2010 | Kogan et al. ................... 717/131 |
| 2004/0128583 A1 | | 7/2004 | Iulo et al. |
| 2004/0205720 A1 | * | 10/2004 | Hundt ............................ 717/124 |
| 2005/0010607 A1 | * | 1/2005 | Parker et al. ................... 707/200 |
| 2005/0022166 A1 | | 1/2005 | Wolff et al. |
| 2006/0150163 A1 | | 7/2006 | Chandane |
| 2007/0011541 A1 | * | 1/2007 | Kogan et al. ................... 714/737 |
| 2007/0061782 A1 | * | 3/2007 | Schreiner et al. .............. 717/124 |
| 2008/0222619 A1 | * | 9/2008 | Huber et al. ................... 717/140 |

OTHER PUBLICATIONS

Augilera, et al; "Performance Debugging for Distributed Systems of Black Boxes"; Operating Systems Review, Oct. 2003, pp. 74-89, vol. 37, No. 5.
Hissam, et al.; "Isolating Faults in a Complex CTOS-Based System"; SEI Monographs on the Use of Commercial Software in Government Systems, Carnegie Mellon Software Engineering Institute; Feb. 1998; http://www.sei.cmu.edu/cbs/monographs/isolating.faults.pdf.

* cited by examiner

*Primary Examiner* — Li Zhen
*Assistant Examiner* — Marina Lee
(74) *Attorney, Agent, or Firm* — Dan Shifrin

(57) ABSTRACT

A method is provided for isolating errors which occur when code supplied by independent software vendors (ISV code) interacts with code supplied by a primary vendor (host code). Code suspected of containing ISV code with host code is executed. If the results are in error, the code is scanned and then compared with a master host code. Any differences are stored in a delta file, including locations in the host code where ISV code hooks into the host code. The code is then modified to by-pass the hooks to ISV code to generate a side-executable code and both codes are executed and the results are compared. A lack of substantial difference in the results is indicative that the ISV code adversely affects the host code while a difference between the results is indicative of an error in the modified code.

9 Claims, 5 Drawing Sheets

DETECTION OF ERRORS CAUSED BY INTERACTIONS OF INDEPENDENT SOFTWARE VENDOR CODE WITH HOST CODE

TECHNICAL FIELD

The present invention relates generally to interactions of independent software vendor code with host code, and in particular, to the isolation of errors caused by such interactions.

BACKGROUND ART

When a computer system is installed, the vendor (the "host vendor") will typically install software code (the "host code") to enable the various features and functions of the system (alternatively, the code may have been preinstalled). Over time, new hardware and new functions may be added to the system, sometimes supplied by the original host vendor but often supplied by other, independent software vendors (ISVs). ISV code typically provides hooks into the host code to intercept execution of the host code and redirect control to the ISV code. After execution of the ISV code has completed, control is returned to the host code which continues execution. Such code interceptions and detours are transparent to the customer and in many cases, the customer may not even be aware of the existence of ISV code.

As will be appreciated, the interaction of ISV code with host code may cause unexpected and unexplained problems and errors. And, importantly, such interactions may make it difficult to diagnose the problems. A technician may suspect that ISV code is present but will not know where the hooks are and will not know if a problem has its origins in the host code or in some ISV code.

SUMMARY OF THE INVENTION

Consequently, a need exists to be able to identify the presence of ISV code and isolate the source of a problem or error. The present invention provides a method for isolating errors which occur when code supplied by independent software vendors (ISV code) interacts with code supplied by a primary vendor (host code). The method comprises generating results from the execution of first code suspected of containing ISV code with host code. If the results are in error, the first code suspected of containing ISV code with host code is scanned and then compared with a master host code. Any differences between the first code and the master host code are stored in a delta file, the differences including locations in the host code where ISV code hooks into the host code. The first code is next modified to by-pass the hooks to ISV code to generate a first side-executable code and both codes are executed. The results from the execution of the first side-executable code are compared with results from the execution of the first code. The lack of substantial difference in the results is indicative that the one or more of the ISV code adversely affects the host code while a difference between the results is indicative of an error in the first side-executable code.

DETAILED DESCRIPTION OF THE PREFERRED EMBODIMENT

Figure 1:
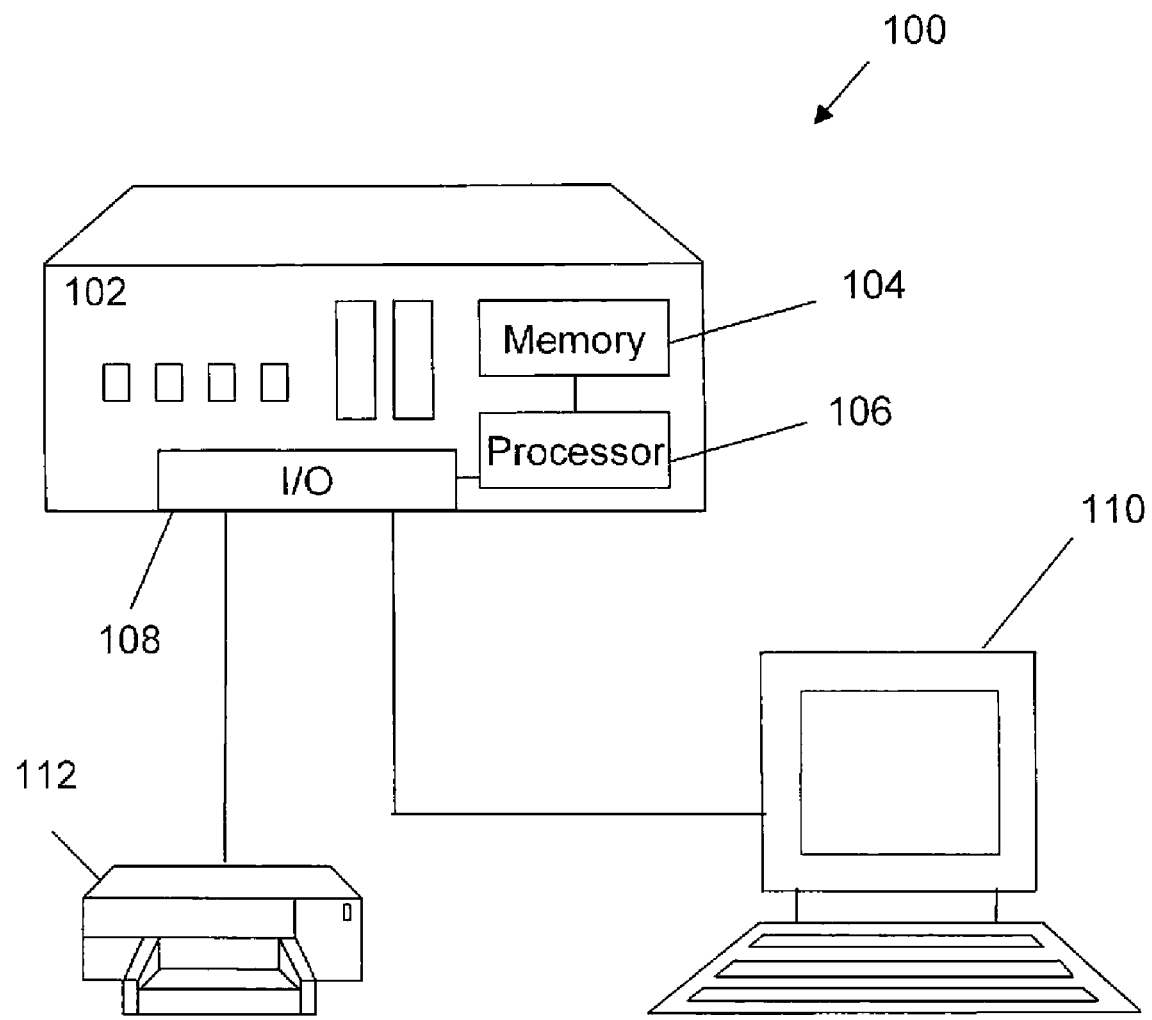
FIG. 1 is a block diagram of a data processing system in which the present invention may be incorporated.

FIG. 1 is a block diagram of a data processing system 100 in which the present invention may be incorporated. The system 100 includes a host computer, which may be of any type. The computer 102 includes a memory 104 for storing program instructions including host code and ISV code. The computer 102 further includes a processor 106 for executing the program instructions, and an interface 108 for coupling the computer 102 to user output devices such as a monitor 110 and printer 112.

Figure 2:
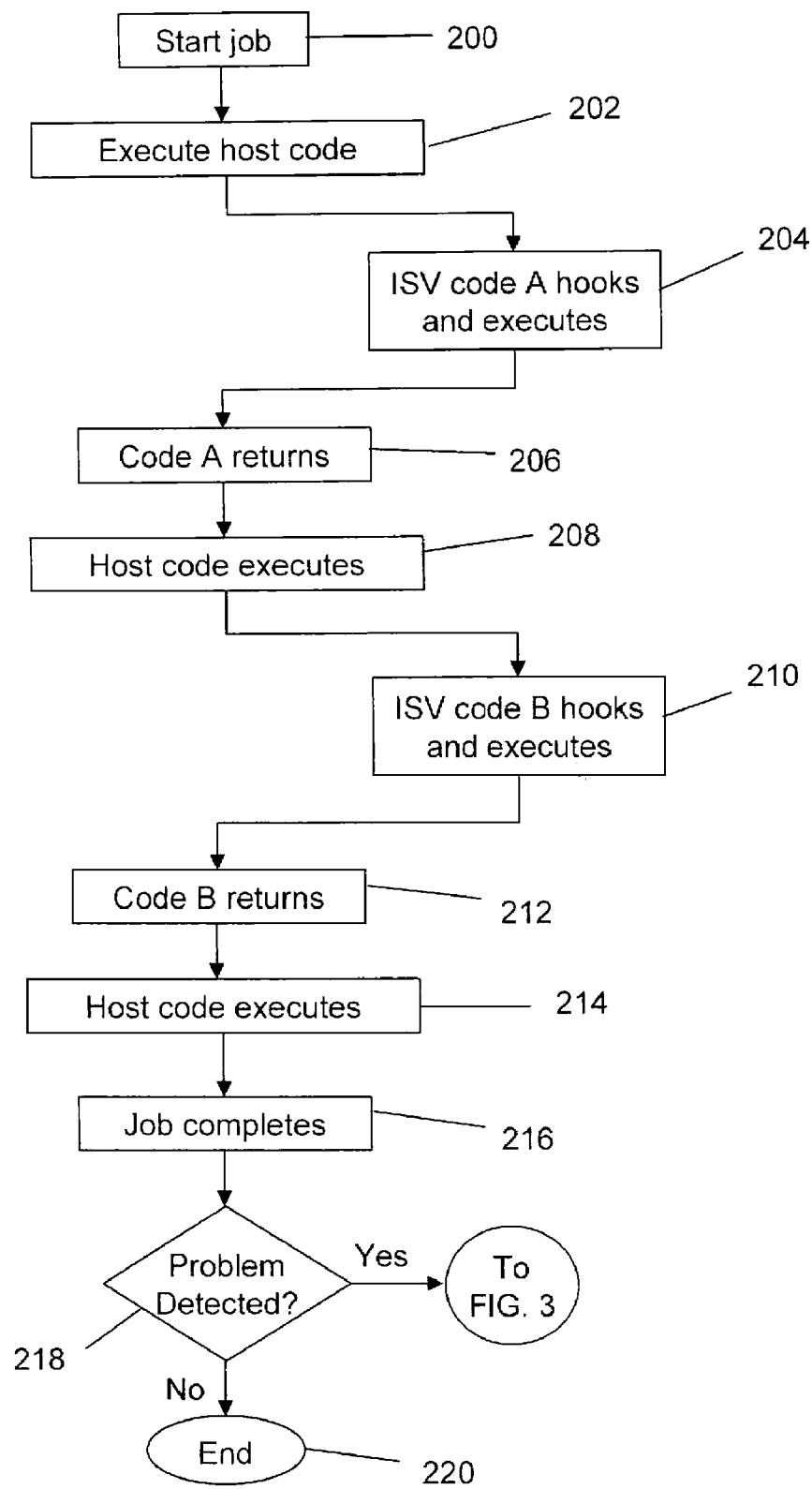
FIG. 2 is a flow chart illustrating the execution of host and ISV code.

FIG. 2 is a flow chart illustrating the execution by the processor 106 of host and ISV code in the memory 104. At the beginning of a job (step 200) the host code begins to execute (step 202). At some location of the host code during execution, previously installed ISV code A is initiated, hooks into the host code and executes (step 204). When execution of ISV code A is complete, ISV code A returns control to the host code (step 206) which resumes execution (step 208). At some other location during execution of the host code, another ISV code, B, is initiated, hooks into the host code and executes (step 210). When execution of ISV code B is complete, it returns control to the host code (step 212) which resumes execution (step 214). It will be appreciated that the foregoing description is merely an overview of the steps and that for clarity, only two ISV codes are used in the example herein. Moreover, it will also be appreciated that additional ISV code may hook into the host code and execute and that the description herein applies equally to an environment in which any number, including only one, ISV products are present. After the job completes (step 216), a problem may be detected (step 218), otherwise, the process ends (step 220).

Figure 3:
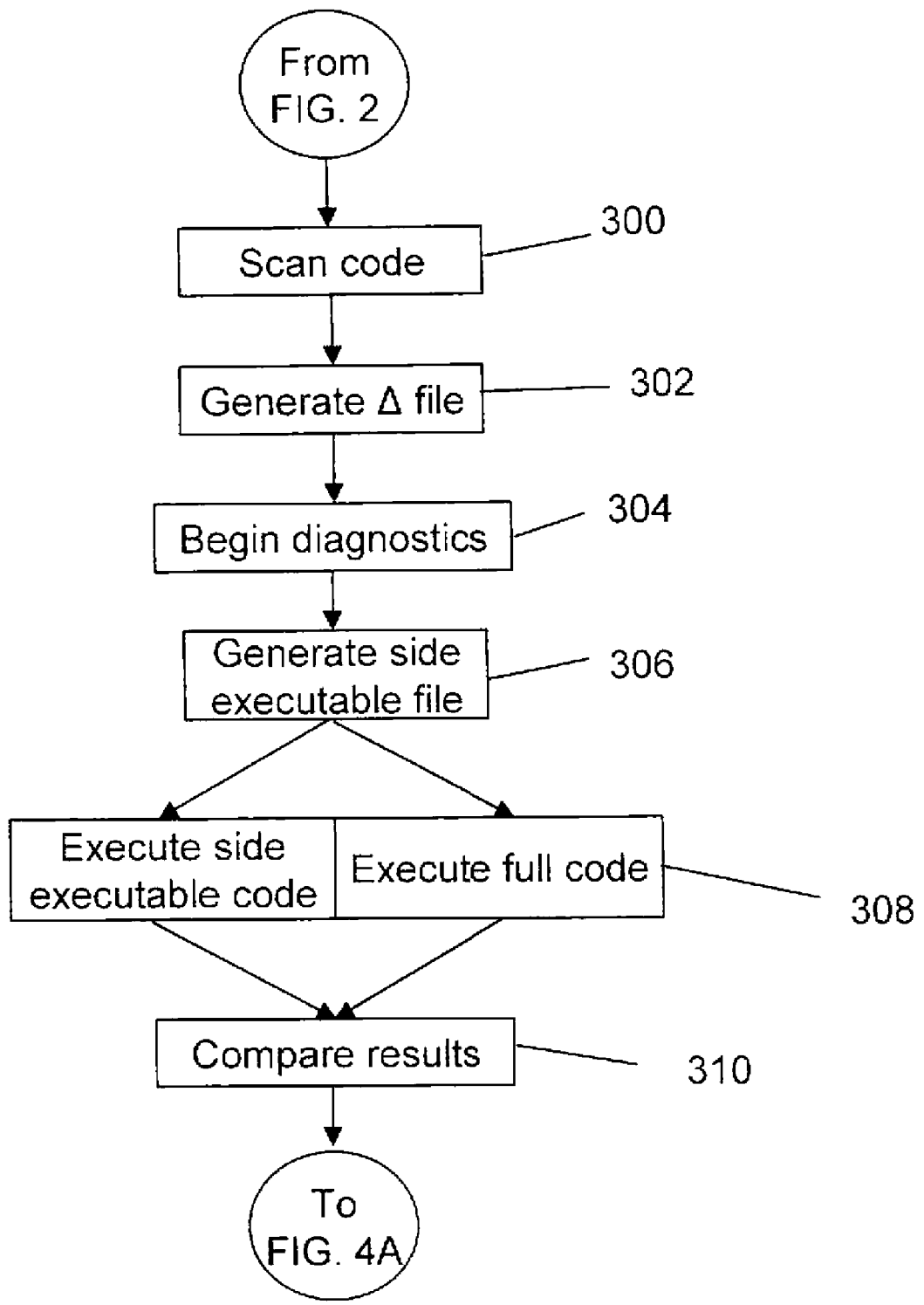
FIG. 3 is a flowchart illustrating a procedure to determine the existence of problems during the execution of host and ISV code.

Turning now to FIG. 3, if a problem was detected during execution of the host/ISV code combination, the entire code is scanned (step 300). During scanning, the code, including product patch area, address tables, branch tables, control value tables and scan load libraries, is examined to determine if it has been modified, if tables have been added or modified or if there are any other irregularities. One process by which the code may be scanned is to compare it with the original host code, such as a master code, and identify any differences. Any such differences are stored in a delta file (step 302) which may be displayed on the monitor 110 or printed on the printer 112 for a technician. If desired, the technician may begin a diagnostic procedure (Step 304). Based on the information contained in the delta file, the technician is able to generate a side-executable file (step 306) which is a "clean" version of the host code with the ISV hooks by-passed and other modifications removed. Both the side-executable code and the full host/ISV code combination are executed (step 308) and the results are compared (step 310).

Figure 4A:
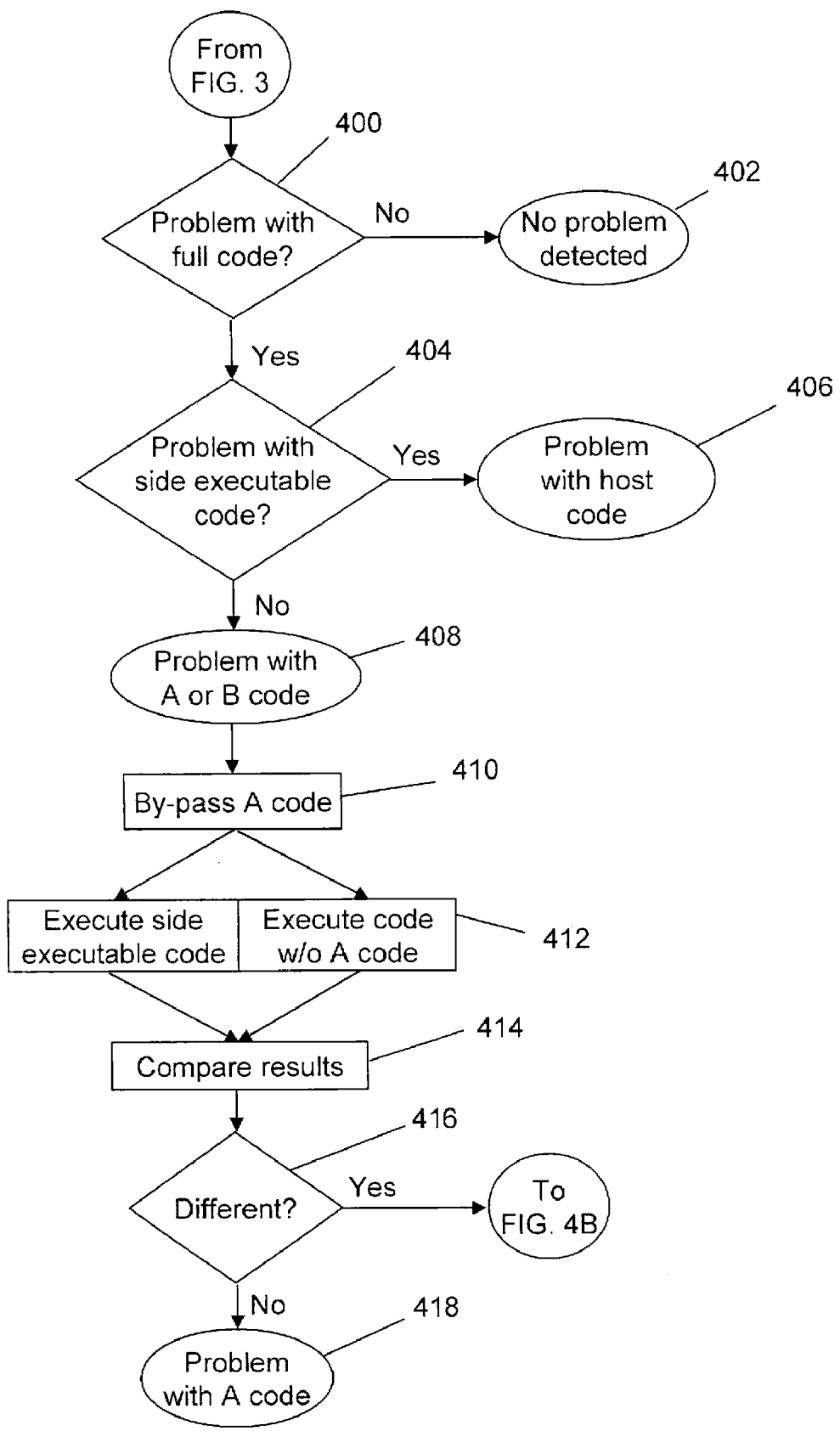
FIGS. 4A and 4B are flowcharts illustrating a procedure to isolate problems caused by interactions of ISV code with host code.

A check is made to see if there is any problem with the results of the execution of the full host/ISV code combination (step 400, FIG. 4A). If not, it is apparent that no problem was detected (step 402) and perhaps a problem is hardware-related. If, on the other hand, a problem is detected, a check is then made to see if there is any problem with the results of the execution of the side-executable code (step 404). If so, an indication is provided to the technician, such as on the monitor 110 or from printer 112, that the problem likely resides in the host code (step 406) and further diagnostics may be required. If no problem occurs from the execution of the side-executable code, an indication is provided that the problem likely resides in the ISV code (step 408).

If desired, it may be possible to further isolate the problem and identify which ISV code has likely caused the problem. Thus, a new side-executable code is generated in which only the ISV code A is by-passed (step 410). Again the original, fully clean, side-executable code and the new code without the ISV code A are executed (step 412) and the results compared (step 414). If the comparison indicates that there is no difference in the results (step 416), an indication is provided that the problem likely resides in the ISV code A (step 418) and attention may be given to that code for removal or further testing. If the results are not substantially the same, however, an indication is provided that the problem likely reside in the ISV code B.

Figure 4B:
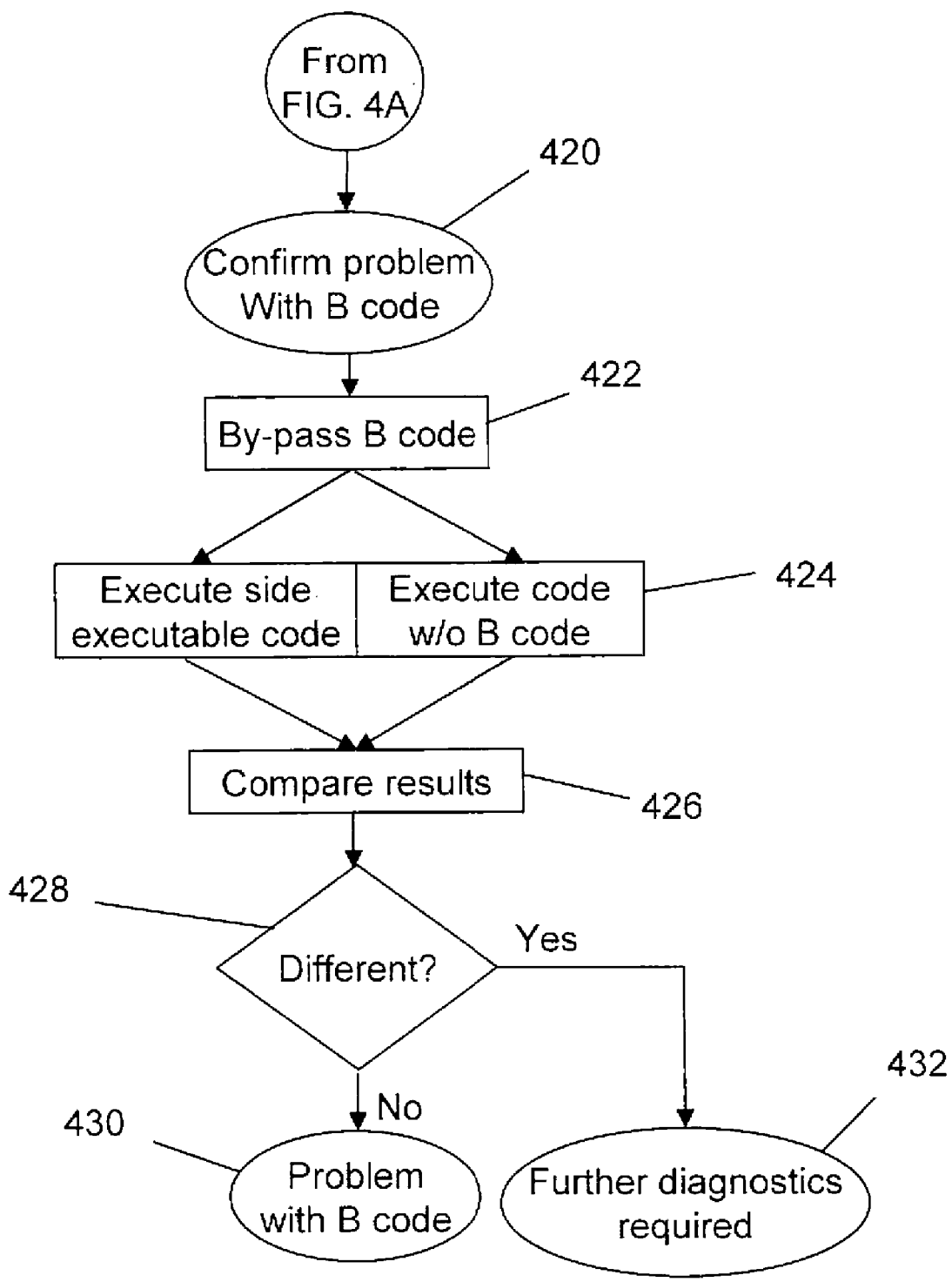

If desired, this conclusion may be confirmed as set forth in FIG. 4B (step 420). Another new side-executable code is generated in which only the ISV code B is by-passed (step 422). Again the original, fully clean, side-executable code and the new code without the ISV code B are executed (step 424) and the results compared (step 426). If the comparison indicates that there is no difference in the results (step 428), an indication is provided that the problem likely resides in the ISV code B (step 430) and attention may be given to that code for removal or further testing. If the results are not substantially the same, however, the ISV code B has not been confirmed as the likely source of the problem and further diagnostics may be warranted (step 432).

As previously noted, the description herein is limited for clarity to processing only two ISV codes. It will be appreciated that additional ISV code, when present, may be processed in a similar manner to isolated problems which occur when the host code is executed. Moreover, while the above procedure may be able to identify either ISV code A or ISV code B as the likely source of a problem, the two may interact in such a way as to create a problem which is not present when either one alone executes. Thus, side-executable code may be generated in which more than one ISV code is by-passed in order to identify possible such interactions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for isolating errors which occur when ISV code interacts with host code or a method for deploying computing infrastructure comprising integrating computer readable code into a computing system for isolating errors which occur when ISV code interacts with host code.

What is claimed is:

1. A method for isolating errors which occur when code supplied by independent software vendors (ISV code) interacts with code supplied by a primary vendor (host code), the method comprising:
    generating results from the execution of first code suspected of containing ISV code with the host code;
    if the results are in error, scanning the first code to determine any differences between the first code and the host code, including locations in the host code where the ISV code hooks into the host code (ISV hooks), wherein scanning the first code comprises scanning through one or more of product patch areas, address tables, branch tables, control value tables and load libraries of the first code;
    based on the differences between the first code and the host code, modifying the first code to by-pass the ISV hooks into the host code to generate a first side-executable code;
    executing the first side-executable code and the first code;
    comparing results from the execution of the first side-executable code with results from the execution of the first code;
    providing a first indicator that the ISV code adversely affects the host code if there is no difference in the results; and
    providing a second indicator that an error may be present in the first side-executable code if there is a difference between the results.

2. The method of claim 1, further comprising, if there is no difference in the results:
    modifying the first code to by-pass and ISV hook of a first ISV code to generate a second side-executable code;
    executing the second side-executable code and the first side-executable code;
    comparing results from the execution of the second side-executable code with results from the execution of the first side-executable code;
    providing a third indicator that the first ISV code adversely affects the host code if there is no difference in the results; and
    providing a fourth indicator that an error may be present in a different ISV code if there is a difference between the results.

3. The method of claim 1, wherein modifying the first code comprises inserting branch instructions in the first code to by-pass the ISV hooks into the host code.

4. A computer program product of a computer readable recordable-type medium usable with a programmable computer, the computer program product having computer-readable code embodied therein for isolating errors which occur when code supplied by independent software vendors (ISV code) interacts with code supplied by a primary vendor (host code), the computer-readable code comprising instructions for:
    generating results from the execution of first code suspected of containing ISV code with the host code;
    if the results are in error, scanning the first code to determine any differences between the first code and the host code, including locations in the host code where the ISV code hooks into the host code (ISV hooks), wherein scanning the first code comprise scanning through one or more of product patch areas, address tables, branch tables, control value tables and load libraries of the first code;

based on the differences between the first code and the host code, modifying the first code to by-pass the ISV hooks into the host code to generate a first side-executable code;

executing the first side-executable code and the first code; and comparing results from the execution of the first side-executable code with results from the execution of the first code;

providing a first indicator that the ISV code adversely affects the host code if there is no difference in the results; and providing a second indicator that an error may be present in the first side-executable code if there is a difference between the results.

5. The computer program product of claim 4, further comprising instructions for, if there is no difference in the results:

modifying the first code to by-pass an ISV hook of a first ISV code to generate a second side-executable code;

executing the second side-executable code and the first side-executable code;

comparing results from the execution of the second side-executable code with results from the execution of the first side-executable code, whereby:

providing a third indicator that the first ISV code adversely affects the host code if there is difference in the results; and providing a fourth indicator that an error may be present in a different ISV code if there is a difference between the results.

6. The computer program product of claim 4, wherein the instructions for modifying the first code comprise instructions for inserting branch instructions in the first code to by-pass the ISV hooks to the host code.

7. A computing system, comprising:

a memory storing code supplied a primary vendor (host code) and code supplied by independent software vendors (ISV code);

an output device;

a processor operable to execute the host code and ISV code and further operable to:

generate results from the execution of first code suspected of containing ISV code with the host code;

if the results are in error, scan the first code to determine any differences between the first code and the host code, including locations in the host code where the ISV code hooks into the host code (ISV hooks), wherein the process is further operable to scan the first code by scanning through one or more of product patch areas, address tables, branch tables, control value tables and load libraries of the first code;

based on the differences between the first code and the host code, modify the first code to by-pass the ISV hooks to the host code to generate a first side-executable code;

execute the first side-executable code and the first code;

compare results from the execution of the first side-executable code with results from the execution of the first code;

provide a first indicator on the output device that the ISV code adversely affects the host code if there is no difference in the results; and provide a second indicator on the output device that an error may be present in the first side-executable code if there is a difference between the results.

8. The system of claim 7, the processor further operable to, if there is no difference in the results:

modify the first code to by-pass an ISV hook of a first ISV code to generate a second side-executable code;

execute the second side-executable code and the first side-executable code;

compare results from the execution of the second side-executable code with results from the execution of the first side-executable code;

provide a third indicator on the output device that the first ISV code adversely affects the host code if there is no difference in the results; and provide a fourth indicator on the output device that an error may be present in a different ISV code if there is a difference between the results.

9. The system of claim 7, wherein the processor is further operable to modify the first code by inserting branch instructions in the first code to by-pass the ISV hooks into the host code.

* * * * *